United States Patent
Borst et al.

(10) Patent No.: US 7,103,689 B2
(45) Date of Patent: Sep. 5, 2006

(54) METHOD FOR AUTOMATIC REPLACEMENT IN AUTOMATION TECHNOLOGY FIELD DEVICES WHERE SWAPPING IS NOT NECESSARY

(75) Inventors: Walter Borst, Fachingen (DE); Alain Chomik, Pulversheim (FR); Marco Colucci, Lorrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/929,762

(22) Filed: Aug. 31, 2004

(65) Prior Publication Data

US 2006/0059283 A1    Mar. 16, 2006

(30) Foreign Application Priority Data

Aug. 17, 2004   (DE)   ............. 10 2004 039 886

(51) Int. Cl.
*G06F 13/00*   (2006.01)
*G06F 11/00*   (2006.01)

(52) U.S. Cl. .............. 710/107; 710/100; 714/1; 714/2; 714/3; 714/4; 714/5; 714/7; 714/43; 714/44

(58) Field of Classification Search ........ 710/100–125, 710/300–317; 714/1–5, 7, 43–44
See application file for complete search history.

(56) References Cited

U.S. PATENT DOCUMENTS

| | | | |
|---|---|---|---|
| 5,862,363 A * | 1/1999 | Taroda et al. ........... 703/25 |
| 6,016,523 A * | 1/2000 | Zimmerman et al. ........ 710/63 |
| 6,098,116 A | 8/2000 | Nixon et al. | |
| 6,148,417 A | 11/2000 | da Silva | |
| 6,449,715 B1 * | 9/2002 | Krivoshein ............... 713/1 |
| 6,701,198 B1 * | 3/2004 | Vandesteeg et al. ........ 700/79 |
| 6,859,755 B1 * | 2/2005 | Eryurek et al. ........... 702/183 |
| 6,871,240 B1 * | 3/2005 | Rupp et al. .............. 710/8 |
| 2003/0099229 A1 * | 5/2003 | Tretter et al. ............ 370/364 |
| 2005/0050401 A1 * | 3/2005 | Matsuki et al. ........... 714/42 |

FOREIGN PATENT DOCUMENTS

| | | |
|---|---|---|
| DE | 102 02 714 | 7/2003 |
| EP | 13 12 992 | 11/2002 |
| WO | WO A 99/31 599 | 6/1999 |

* cited by examiner

*Primary Examiner*—Rehana Perveen
*Assistant Examiner*—Faisal Zaman
(74) *Attorney, Agent, or Firm*—Bacon & Thomas

(57) ABSTRACT

A method for operating an automation technology field device connected via a bus system with a superordinated unit and having an identifier identifying the type of the field device, at least one alternative identifier AKF1, which identifies a similar type of field device, is stored, in addition to an identifier KF1, in the field device F1. This alternative identifier AKF1 is transmitted, on query, to the superordinated unit PLC, when the superordinated unit fails to accept as valid the identifier KF1 transmitted in prior queries. In this way, a replacement of a field device is possible simply and quickly.

10 Claims, 1 Drawing Sheet

METHOD FOR AUTOMATIC REPLACEMENT IN AUTOMATION TECHNOLOGY FIELD DEVICES WHERE SWAPPING IS NOT NECESSARY

FIELD OF THE INVENTION

The invention relates to a method for operating a field device for automation technology, the field device being connected via a bus system with a superordinated system and having an identifier which identifies the type of field device.

BACKGROUND OF THE INVENTION

In automation technology, field devices are used for registering and/or influencing process variables. Examples of such field devices are fill level measuring devices, mass flow rate measuring devices, pressure and temperature measuring devices, etc., which, as sensors, register the corresponding process variables fill level, flow rate, pressure and temperature, respectively.

For influencing process variables, the field devices may include actuators, which, e.g. as valves, can change the flow rate of a liquid in a section of pipeline or, as pumps, the fill level in a container.

In principle, all devices installed near a process and which deliver, or process, process-relevant information, are referred to as field devices.

Field devices are available from the firm Endress+Hauser in many different forms.

Normally, field devices as used in modern industrial plants are connected via bus systems (PROFIBUS, FOUNDATION FIELDBUS, etc.) to superordinated, or higher level, units (control system or units). These superordinated units serve for, among other things, process control, visualization, and monitoring, as well as for commissioning of the field devices.

Known applications of bus systems include all plants and manufacturing facilities where analog signals have been used for communicating measured values. This includes a multitude of areas of application, such as the chemicals industry, petrochemicals, foods, manufacturing in general, etc. The size of the systems reaches from the smallest of plants with around 10 sensors and actuators, up to large plants with hundreds of sensors and actuators.

Often with such applications, older field devices are in use, and, to assure reliable process execution, they must periodically be checked and maintained. Frequently, field devices last for years in use. Some field devices are replaced, for safety's sake, by new ones on the basis of preventative maintenance following a preestablished number of hours of operation, in order to avoid device failure. Thus, it is known that the probability of electronic device failure rises with increasing time in service.

Normally, one strives to replace the field devices with devices of the same construction, since these are easiest to integrate into a running application.

Device manufacturers, however, are constantly developing their products, and, consequently, remove older models from the market, following a certain amount of time.

Thus, it is possible that a device of the same construction will no longer be available for a planned replacement. The user then has two alternatives, either install a model of a newer generation of such devices, or obtain a device of another manufacturer. As a rule, the user decides for a newer model.

A problem that results when an older field device is replaced by a newer model is that it is more complicated to integrate the newer device into the application, i.e. into the automated process. Thus, many bus systems are such that a new device first has to be introduced to the control system, before it can be accepted for use in operation of the automated facility.

The integration of field devices of the same construction is relatively easy, since only slight, or even no, adjustments have to be made concerning the device or the control.

For the integration of field devices of different construction, the controller must be placed in a hold mode and the configuration of the controller so modified that the new device is correctly recognized by the controller. To this end, at least a portion of the process at a plant must be stopped. This is a very undesirable circumstance for the user. Moreover, the configuration of a controller can only be done by specialists and not by the usual operating personnel.

Measures of this character can bring about considerable costs for the user.

An object of the invention is, therefore, to provide a method for operating a field device for automation technology not exhibiting the above-described disadvantages and which, in particular, enables a simple device replacement during ongoing operation, without it being necessary to place a plant in a state of shutdown.

This object is achieved by the provision of at least one alternative identifier, which identifies a similar type of field device, and reporting, on query, to the superordinated unit when the superordinated unit has failed to accept as valid the identifier reported in prior queries.

Advantageous further developments of the invention are set-forth in the dependent claims.

An essential idea of the invention is to store in the field device, along with its own identifier, also other, alternative identifiers, which identify similar field device types, so that if, in the case of a querying by a superordinated unit, the superordinated unit fails to accept as valid the identifier reported in response to an earlier query, then one of the alterative identifiers is reported.

In this way, during initialization, when the superordinated unit does not accept the reported identifier, then an alternative identifier is reported to the superordinated unit. For the control program in the superordinated unit, there is no difference as compared to the state before device replacement. Thus, for the superordinated unit, it seems as if a device exchange has not transpired. The superordinated unit still "sees", in effect, the old field device. Consequently, no changes are required in the superordinated unit.

Advantageously, the bus system is a PROFIBUS DP or a PROFIBUS PA.

Normally, the superordinated unit is a controller (e.g. a PLC functioning as a Master Class 1 device).

In an alternative embodiment, the superordinated unit assigns a Profibus identification number (Ident-No.) to the field device functioning as a slave device.

Advantageously, a change of the identifier is only permitted during the initialization phase of the communication of the field device.

The invention will now be explained in greater detail on the basis of an example of an embodiment shown in the drawing.

The method of the invention is especially suited for device replacement in the case of field devices for automation technology.

DESCRIPTION OF THE PREFERRED EMBODIMENT

Figure 1:
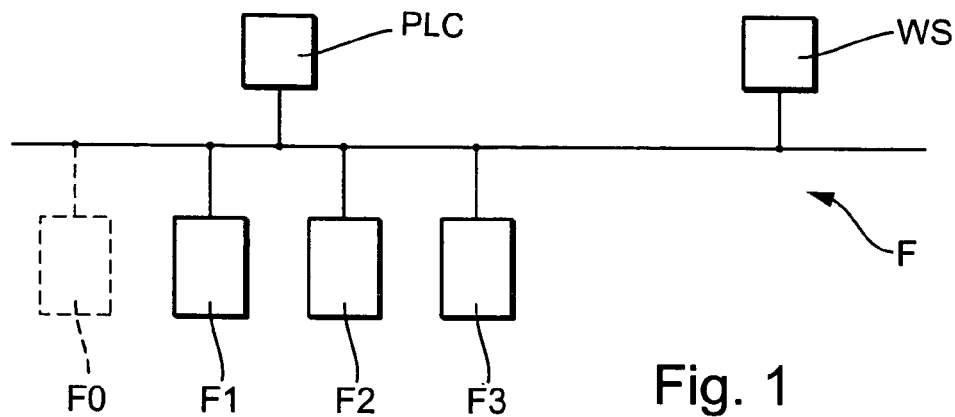
FIG. 1 a typical field bus system, including a plurality of field devices and a superordinated unit.

FIG. 1 shows a small bus system F with three field devices F1, F2, F3, a controller PLC, and an additional superordinated unit in the form of a workstation WS. The bus system F is a Profibus PA or a Profibus DP system.

A possible application is an overflow protection for a liquid-containing tank, with a field device for measuring the fill level in the tank, and a further field device in the form of a valve, for controlling outflow from the tank. Additionally provided is a field device in the form of a limit level switch, for detecting maximum fill level in the tank. The control program in the controller (which can be a programmable logic controller PLC) controls the fill level in the tank. The controller PLC is a Profibus master, while the field devices F1, F2, F3 are Profibus slaves. Communication between the controller PLC and the field devices occurs according to the known Profibus standards.

Figure 2:
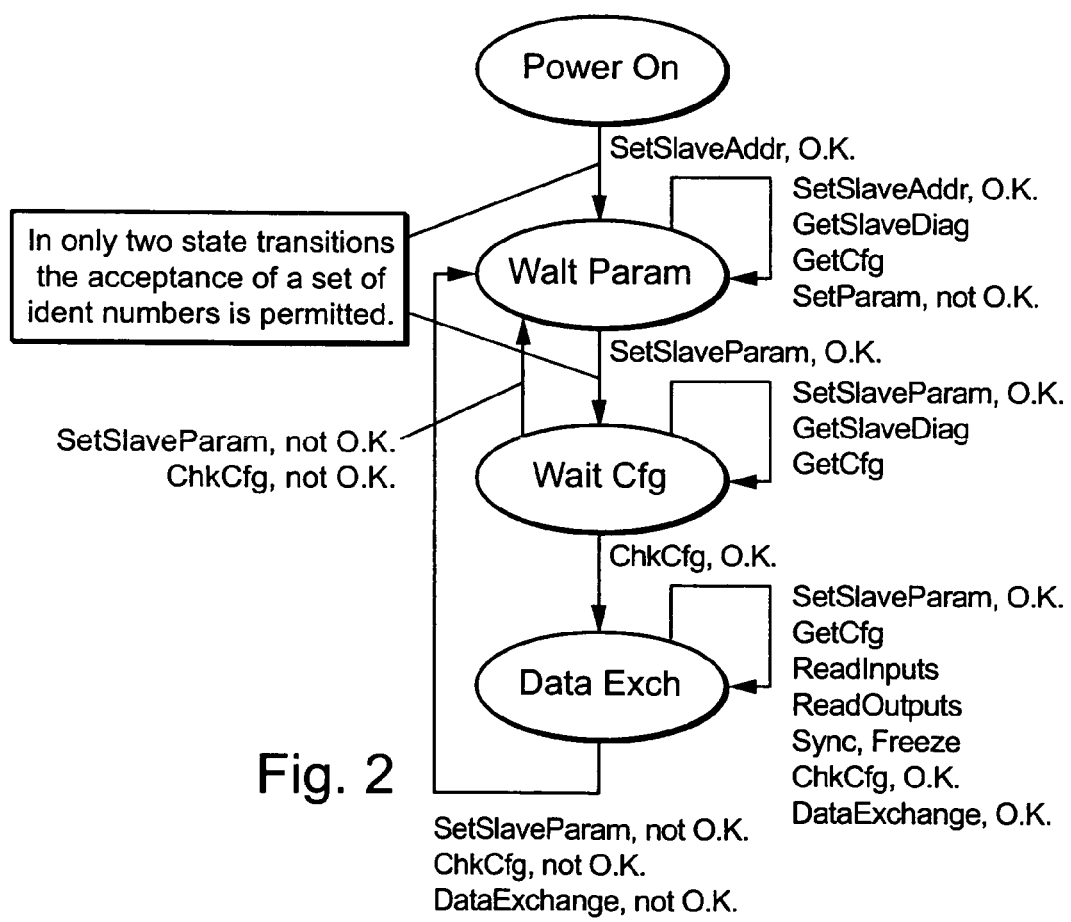
FIG. 2 a schematic, state-machine representation of a method of the invention.

FIG. 2 is a schematic presentation of a Profibus state machine for the field device F1. Following switching of the power supply on (State Power On), the system transfers into the state "Waiting for Parametering" (Wait Param). After successful parametering, the system transfers into the state "Waiting for Configuring" (Wait Cfg). Following successful configuring, the state "Data Exchange" (Data Exch) is reached. In this state, the PLC and the field devices F1, F2, F3 can exchange data with one another.

The method of the invention will now be explained in greater detail.

The field device F1 is to replace the originally present field device F0 (shown with dashed lines in FIG. 1).

To this end, the connection of the field device F0 with the bus system is removed, the field device F1 is connected to the bus system, and the power supply is turned on. The state "Power On" of the state machine of FIG. 2 has then been reached. The device executes a self-test and awaits parametering ("Wait Param"). Using the service GetSlaveDiag, the master, the control unit PLC, queries the field device F1 for, among other things, the identifier (Ident-No.). The field device F1 sends its identifier KF1 to the control unit. The control unit PLC accepts only the identifier KF0, i.e. the identifier of the originally installed field device F0. The control unit PLC, therefore, continuously repeats this query GetSlaveDiag.

Due to these repeated queries, the field device recognizes that its identifier evidently is not being accepted by the control unit. It reports, therefore, following one, or more, failed attempts, an alternative identifier AKF1, which corresponds to the identifier KF0 of the originally installed field device F0, i.e. AKF1=KF0. This identifier is accepted by the control unit as valid, and the field device F1 transfers to the state "Wait Cfg" and then into the state "Data Exch".

The control program running in the control unit PLC can now continue normally. No changes are needed either in the field device or in the control unit PLC. No specialists are needed for the device replacement e.g. for changing the system configuration of the control unit PLC.

The alternative identifier AKF1 stored in the field device F1 corresponds to the identifier of a similar type of field device, the field device F0. It is also possible to store a plurality of alternative identifiers in the field device F1.

The bus system can be e.g. a PROFIBUS DP or a PROFIBUS PA. The identifier named for the Profibus Ident-No. is assigned by the Profibus User Organization for the individual field devices.

The control unit PLC communicates via MSCY_C1 services (Master-Slave Class 1 cyclic) with the field device functioning as a slave.

In an alternative embodiment of the invention, the control unit PLC sends the field device F1 the identifier KF0, i.e. the identifier that it supports, and the field device F1 adapts itself to this identifier. This variant is used for the case where the controller PLC does not use a GetDiag service for startup, but, instead, immediately calls-up a SetParam or SetSlaveAddr service. In these services, the desired identifier is included in the transmission from the controller PLC. Provided that the identifier is supported in the field device, the field device reacts thereto and confirms the service positively. A matching of the identifier of the field device F1 to the identifier supported by the controller is possible only during the initialization phase of the bus communication.

The changing of the identifier of the field device F1 must, naturally, be compliant with the corresponding bus specifications. In particular, the method is compliant with the Profibus specifications.

The method of the invention is suited especially well for the replacement of automation technology field devices that are connected via a field bus with a superordinated unit and integrated into a control program.

We claim:

1. A method for operating a field device for automation technology, the field device being connected via a bus system with a superordinated unit, comprising the steps of:
    storing in the field device a first identifier, which identifies the type of field device;
    with storing at least one alternative identifier in the field device, which identifies a similar type of field device; and
    transmitting, on query, the alternative identifier to the superordinated unit, in the case that the superordinated unit does not accept the first identifier, which was sent in prior queries.

2. The method as claimed in claim 1, further comprising the step of:
    installing the field device as a successor device for a field device F0 whose identifier is KF0, wherein:
    KF0 is provided as the alternative identifier in the field device; and
    the field device is a type of field device similar to the field device F0 and has essentially the same functionalities.

3. The method as claimed in claim 1, wherein:
    the bus system is a Profibus-DP or a Profibus-PA system, and
    the identifier is a Profibus Ident-No.

4. The method as claimed in claim 1, wherein:
    the superordinated unit is a controller PLC, which functions as a Master Class 1 device and communicates with the field device functioning as a slave via MSCY_C1 (Master-Slave Class 1 cyclic) services.

5. The method as claimed in claim 1, wherein:
    the superordinated unit uses a service SetSlaveAddr or SetParam to offer a Profibus Ident No. to the field device functioning as a slave.

6. The method as claimed in claim 1, wherein:

the superordinated unit uses the service GetSlaveDiag to request the field device functioning as a slave to send back at least its Ident-No.

7. The method as claimed in claim 1, wherein:

only in the initialization phase of the bus communication of the field device is an automatic adapting of the identifier permitted.

8. The method as claimed in claim 1, wherein:

a change of the identifier is permitted only in the state "Waiting for Parametering" (Wait Param).

9. The method as claimed in claim 1, wherein:

the change of the identifier is compliant with Profibus specifications.

10. The method for exchanging automation technology field devices connected via a field bus with a superordinated unit, wherein:

a present, first field device, which is integrated into a control program of the superordinated unit, is replaced by a new, second field device; and the new, second field device operates according to the method defined in claim 1.

* * * * *